United States Patent [19]

Baird et al.

[11] Patent Number: 4,527,486
[45] Date of Patent: Jul. 9, 1985

[54] VEHICLE WITH SELECTIVELY USEABLE WHEEL SETS

[75] Inventors: William R. Baird; Billy C. Baird, both of Sturgis, Ky.

[73] Assignee: Saturn Machine & Welding Co., Inc., Sturgis, Ky.

[21] Appl. No.: 503,884

[22] Filed: Jun. 10, 1983

[51] Int. Cl.³ .................. B61F 13/00; B61D 11/02
[52] U.S. Cl. .................. 105/215 C; 105/364
[58] Field of Search .................. 105/215 C, 364

[56] References Cited

U.S. PATENT DOCUMENTS

| | | | |
|---|---|---|---|
| 784,162 | 3/1905 | Hunt | 105/215 C |
| 2,718,195 | 9/1955 | Bock et al. | 105/215 C X |
| 3,130,686 | 4/1964 | Fiechter et al. | 105/215 C |
| 3,353,504 | 11/1967 | Kersey et al. | 105/215 C |
| 3,717,108 | 2/1973 | Thompson, Jr. | 105/364 X |
| 3,756,163 | 9/1973 | Simmons | 105/215 C |
| 3,822,649 | 7/1974 | Walk et al. | 105/215 C |
| 3,898,938 | 8/1975 | Poole | 105/215 C |
| 3,905,306 | 9/1975 | Janes | 105/215 C |
| 4,235,168 | 11/1980 | Amoroso | 105/215 C |
| 4,355,584 | 10/1982 | White, Jr. | 105/215 C |

Primary Examiner—Robert B. Reeves
Assistant Examiner—Dennis C. Rodgers
Attorney, Agent, or Firm—Harvey B. Jacobson

[57] ABSTRACT

A mine supply car has fixed, rail-engageable wheels, and adjustable selectively useable road wheels mounted in elongate frames along the sides of the car. The road wheels are mounted on pivot arms for swinging movement between raised inoperative positions and lowered operative positions. The arrangement allows the car to be converted between rail and road use by relatively effortless manual movement of the road wheels.

16 Claims, 7 Drawing Figures

VEHICLE WITH SELECTIVELY USEABLE WHEEL SETS

BACKGROUND OF THE INVENTION

This invention relates to vehicles, particularly mine supply cars, having selectively useable wheel sets, for example a rail-engageable wheel set and a road wheel set enabling the vehicle to operate either by rail or by road (or similar surface) by conversion to the appropriate wheel set.

Mine supply cars having flanged, rail-engageable wheels, and rubber-tired road wheels, which may be used selectively, are known in the art. During operation, for example, a car may be towed by electric locomotive down into a mine on a rail track to a point where the rail track terminates. At this point, the car may be taken off the rail track and moved on its road wheels to a final destination at or near the mine face. A reverse procedure may be adopted for returning the mine car to the surface. Thus, mine supply cars of this type include a mechanism for transferring support of the car as between the rail wheels and the road wheels, such mechanism commonly including apparatus for selectively raising and lowering one set of wheels relative to the other set.

SUMMARY OF THE INVENTION

The invention provides a simple and reliable apparatus for effecting conversion as between selectively useable wheel sets on a vehicle of the type referred to, particularly a mine supply car, adaptable to use in a rail operating mode or a road operating mode.

In accordance with the invention, for a vehicle having selectively useable wheel sets, the wheels of one of the sets are each carried by a pivot arm assembly on a frame (which may comprise part of the vehicle framework, or which may be attached to the vehicle framework) the arm, being engageable with either one of a pair of latch devices associated with the frame at positions on opposite sides of the axis about which the arm assembly pivots. The arrangement may be such, for example, that the arm assembly can be manually swung through 180° between positions in which it engages the respective latch devices, and the wheel may be mounted on the arm assembly in an offset position relative to the pivot axis, whereby, when the assembly is in engagement with one latch device, the wheel is in operative lowered position with respect to the wheels of the other set, and when the assembly is in engagement with the other latch device, the wheel is vertically displaced into inoperative raised position with respect to the wheels of the other set.

The latch devices, may, for example, each comprise a pivoted locking member having a cam profile adapted automatically to lock the arm assembly in position when the assembly is swung into engagement therewith, and which may be pivoted to release the assembly, for manual swinging of the assembly into engagement with the opposite latch device.

The swinging action of the pivot arm assemblies makes it possible for an operator to raise and lower the respective wheels with almost the same degree of ease as is involved in turning a free wheel on its axle.

The invention may be embodied in the form of an attachment for existing mine cars having conventional rail-engageable wheels, whereby such cars can be fitted with auxiliary road wheels, or alternatively, the invention may be embodied in purpose-built mine cars incorporating both rail and road engageable wheels.

In contrast to the known wheel conversion systems of the prior art, wheel assemblies in accordance with the invention employ no springs, ratchets, or hydraulic systems requiring repair or replacement, making the subject assemblies simpler to maintain and operate.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
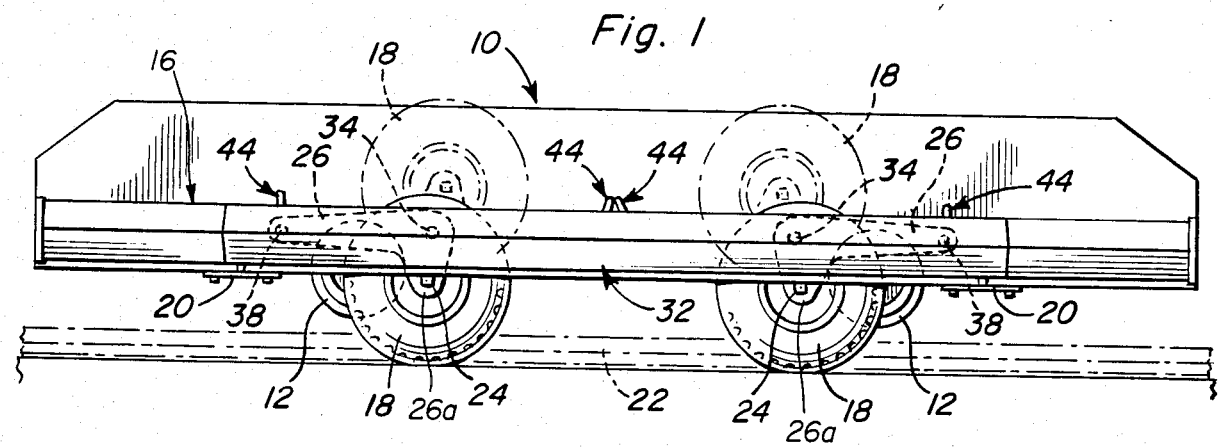
FIG. 1 is a side view of a mine supply car equipped with selectively useable wheel sets in accordance with the invention.
Figure 2:
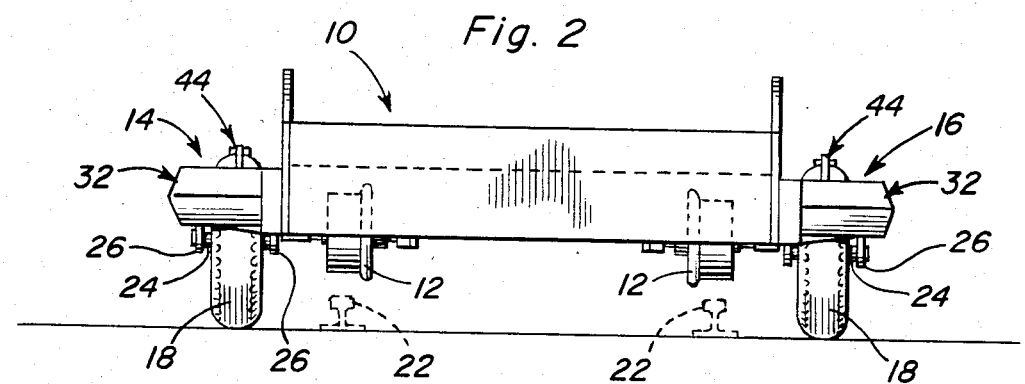
FIG. 2 is an end view of the mine supply car.
Figure 3:
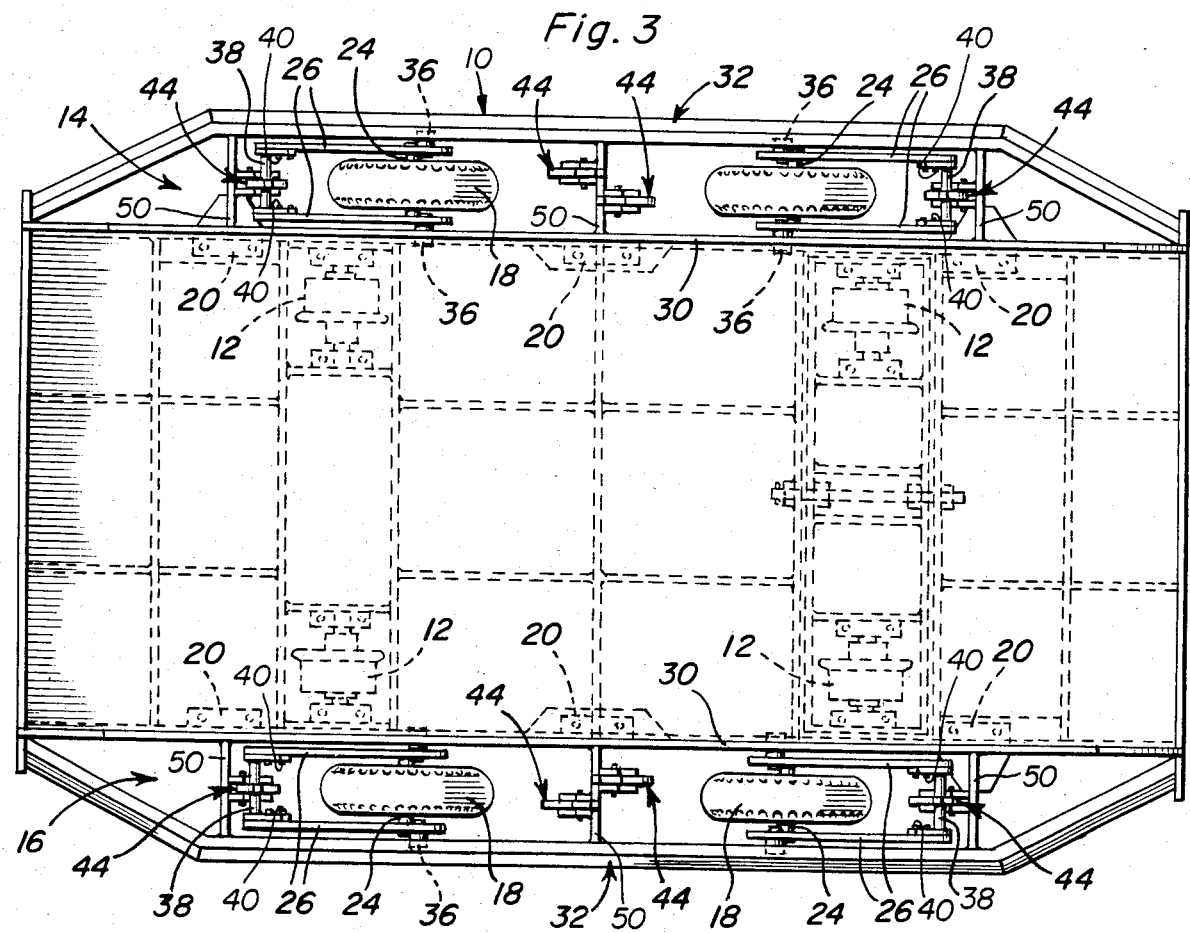
FIG. 3 is a plan view of the mine supply car.

Referring initially to FIGS. 1 to 3, there is illustrated a conventional form of mine supply car 10 having flanged, rail-engageable wheels 12. Further, the supply car is provided with elongate attachment frames 14 and 16 along its respective sides, each frame incorporating a pair of road wheel assemblies including rubber-tired road wheels 18 which may be used selectively as alternatives to the rail wheels 12, by lowering the road wheels into operative positions, as will be described.

Each of the frames 14 and 16 may be attached as by brackets 20 and suitable bolts to the framework of an existing car 10, as illustrated, or alternatively the frames may be incorporated in the framework of a purposebuilt mine car.

As shown in FIGS. 1 and 2, wheels 18 have a lowered, operative road-engaging position (shown in solid line) wherein the wheels occupy positions at a lower level than the rail wheels 12, so that the rail wheels will clear rails 22 of an appropriate rail track. The road wheels 18 also have an inoperative raised position (shown dotted in FIG. 1) wherein they occupy positions at a higher level than the rail wheels to enable the rail wheels to run on rails 22. The mechanism for selectively lowering and raising the road wheels will now be described.

Figure 4:
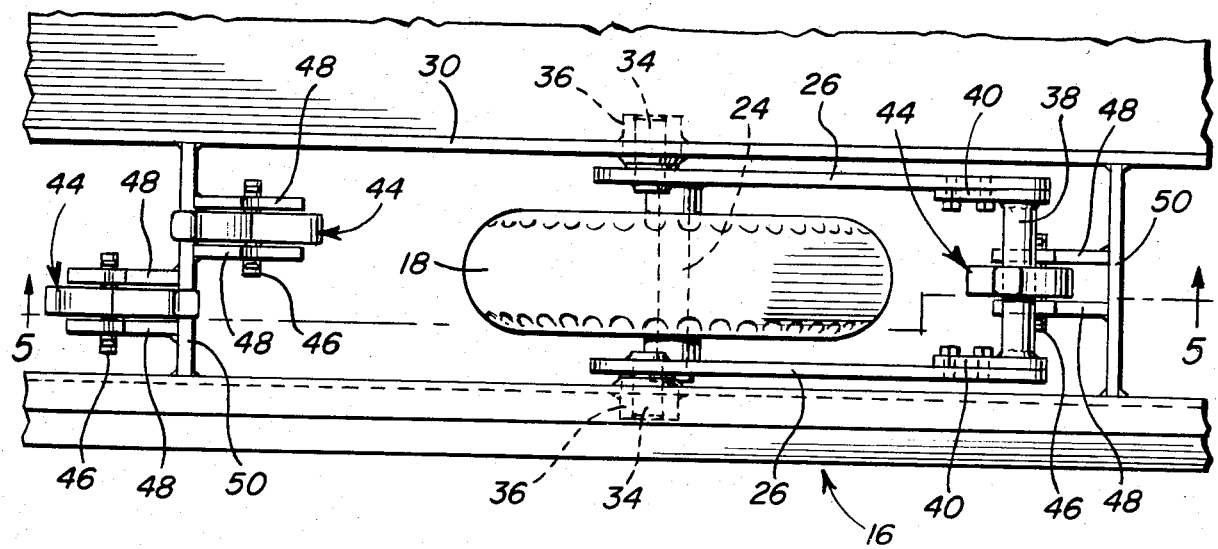
FIG. 4 is a detailed plan view, on an enlarged scale, of one wheel assembly of the mine supply car.
Figure 5:
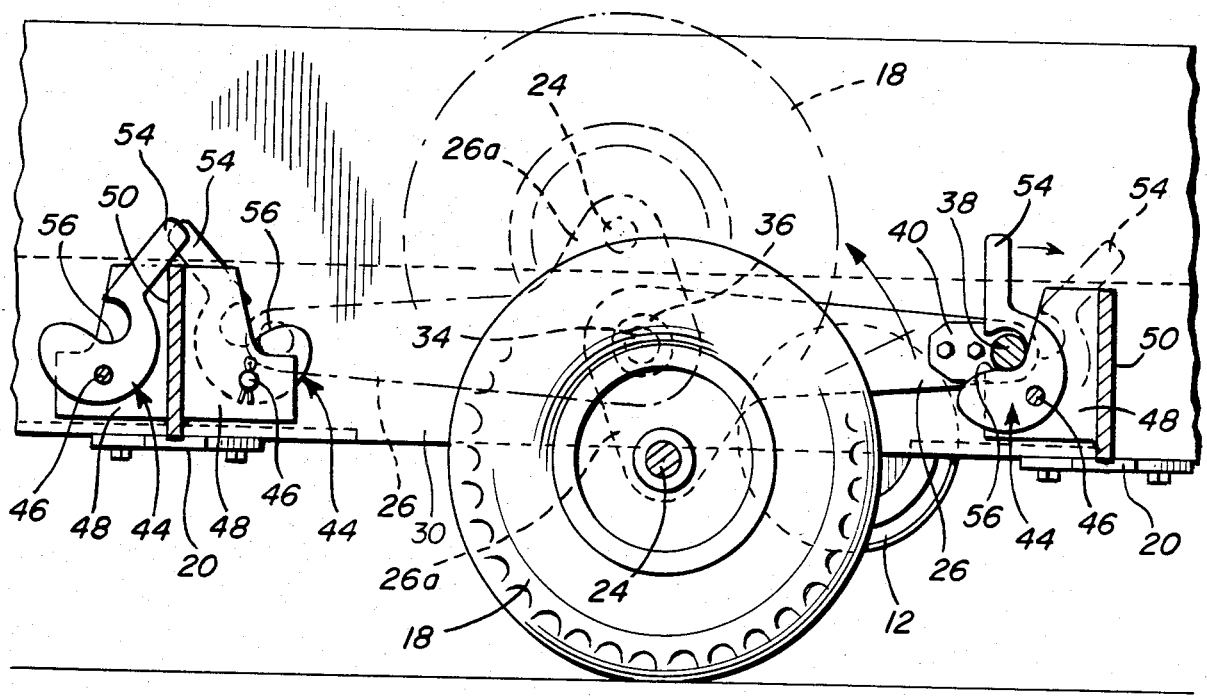
FIG. 5 is a sectional view on line 5—5 of FIG. 4.

As shown more particularly in FIGS. 4 and 5 each of the wheels 18 is mounted on an axle 24 connected between a pair of arms 26 of a pivot arm assembly, the arms being pivotally mounted adjacent one end between inner and outer frame members 30 and 32 of the respective frames 14 and 16 by pivot pins 34 and journals 36. The opposite ends of arms 26 are connected by cross-links 38 welded to plates 40 which are bolted to the respective arms (see FIGS. 5 and 6). By this arrangement, each pivot arm assembly comprising the inter-connected arms 26, cross-link 38 and wheel 18 may be swung about a pivot axis defined by the pins 34 and journals 36.

Cross-links 38 are selectively engageable with releasable left and right hand latch devices incorporating pivotal latch members 44 positioned respectively on opposite sides of the aforesaid pivot axis, so that the cross-links 38 swing through substantially 180° between the latch devices and the arms 26 swing between oppositely disposed substantially horizontal positions. Moreover, it will be noted that the axles 24 of wheels 18 are attached to enlarged portions 26a of the respective arms 26 (see particularly FIG. 5) in offset relation to the pivot pins 34, so that vertical displacement of the axles is effected when the cross-links are swung between the respective latch devices, whereby wheels 18 are moved between their operative and inoperative positions.

Each latch member 44 (see FIGS. 4 and 5) is mounted on a pivot pin 46 between a pair of plates 48 welded to a cross plate 50, which is itself welded to inner and outer frame members 30 and 32. Each latch member 44 has a receiving pocket for the respective cross-link 38, and an operating handle 54, the receiving pocket being defined by a cam surface 56. The balance of each latch member may be such that when it is not in engagement with a cross-link 38, the latch member will tend to assume a link-receiving position shown at the left hand end of FIG. 5 (and also shown dotted at the right hand end of FIG. 5). When, however, a link 38 is swung into engagement with a latch member, the latch member may be cammed by the link into a retaining and locking position shown in full line at the right of FIG. 5. In this orientation, the latch device supports and locks the associated pivot arm assembly in position. Then, to swing the assembly to its alternative position, it is necessary to pivot the latch member about pivot pin 46 by means of handle 54 to its receiving position.

For use of mine cars in accordance with the invention, it is recommended that wheel-receiving wells for wheels 18 be provided at the end of a rail track section where the car is to be converted from rail to road use, or vice versa. When, for example, a loaded car has been towed by a locomotive along the track section, on wheels 12 (with wheels 18 in the raised inoperative position) wheels 18 may then be lowered into the wheel wells by manually swinging the pivot arm assemblies between their respective latch devices without the wheels 18 lifting any part of the loaded mine supply car. The car may then be towed so that wheels 18 will move out of the wheel wells and along an appropriate road or similar surface adjacent the working face of the mine, by a suitable towing vehicle. For converting from road use to rail use, the car may be towed so that wheels 18 enter the wheel wells, and the above operations may then be reversed. In either case, the car can be converted for use from one mode to the other simply by swinging the pivot arm assemblies manually through 180° with no powered mechanical devices being required for the conversion and with minimal manual effort being involved.

It will be noted in FIGS. 1 and 3 that the respective front and rear road wheel pivot arm assemblies swing outwardly towards the opposite ends of the car into their respective operative positions and inwardly towards the center of the car into their respective inoperative positions. Also, to facilitate operation, the respective latch devices may be laterally offset as illustrated.

Figure 6:
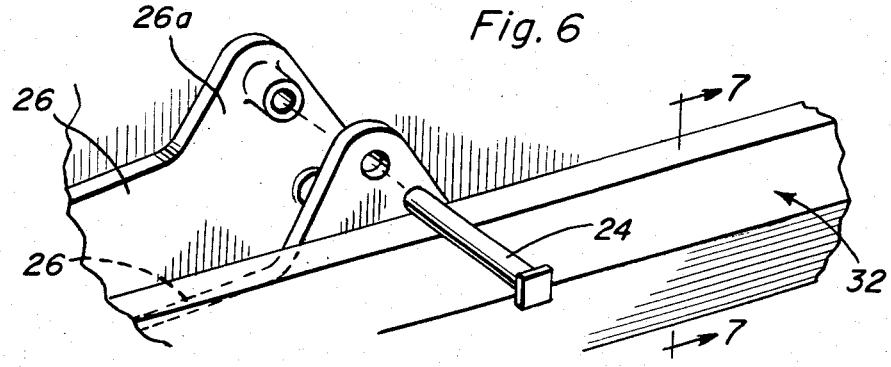
FIG. 6 is a perspective view of a part of the wheel assembly shown in FIG. 4.
Figure 7:
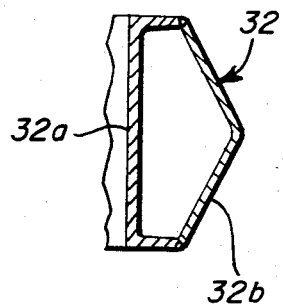
FIG. 7 is a sectional view on line 7—7 of FIG. 6.

FIG. 6 illustrates the manner in which a road wheel axle 24 may be removed for replacement of the associated road wheel, when the respective pivot arm assembly is in elevated position. In accordance with a further advantageous feature of the invention, outer frame members 32 may be in the form of rub rails for protecting the road wheels, for example if the sides of the car are scraped against underground mine workings. The rub rails also act as bumpers when, for example, a car is turned over to unload its contents. A suitable rub rail construction is illustrated in FIG. 7 where it is evident that outer frame member 32 may comprise a channel section 32a and a hardened steel profiled rubbing plate 32b welded to the channel section.

It will be evident from the foregoing that the invention provides a simplified and convenient means for providing a wheeled vehicle with selectively useable wheel sets, wherein the wheels of one set are adapted for manual raising and lowering movement between operative and inoperative positions in an expeditious manner without the need for specialized equipment and without requiring the use of powered operating means. Further, the geometry of the wheel mounting assemblies and the 180° swinging movements thereof between their alternative locations provides optimal clearance from the ground of the road wheels when these are not in use.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. For use in a wheeled vehicle such as a mine supply car, to provide the vehicle with selectively useable wheel sets whereby the vehicle may be converted for use in alternative operating modes by raising and lowering one of the wheels sets between operative and inoperative positions, the combination comprising a frame means on each side of the vehicle for mounting the wheels of said one set, a pivot arm assembly for each wheel of said one set, an axle attaching each wheel of said one set to the respective pivot arm assembly, means pivotally mounting each pivot arm assembly on the frame means for swinging movement about a pivot axis, and a pair of releasable latch devices on the frame means for each pivot arm assembly, the respective latch devices being selectively engageable by the pivot arm assembly for retaining the assembly in selected positions, the latch devices being angularly displaced in relation to the pivot axis of the assembly and the wheel axle being offset from the pivot axis for providing vertical displacement of the associated wheel between the operative and inoperative positions by swinging movement of the pivot arm assembly from engagement with one of the latch devices into engagement with the other of the latch devices, wherein the latch devices of each pair are located in a substantially horizontal plane on opposite sides of the pivot axis of the associated pivot arm assembly, for the assembly to swing through substantially 180° between positions engaging the respective latch devices each pivot arm assembly comprising a pair of pivot arms having pivot pins at one end thereof defining the pivot axis and pivotally connecting the arms to respective inner and outer side frame members of the frame means, a latch formation at the other end of the arms for engagement with the respective latch devices, and wherein the axle of the associated wheel is connected between the arms in vertically offset relation to the respective ends.

2. The combination of claim 1 wherein each pivot arm assembly includes a cross-link connecting the respective arms and defining the latch formation.

3. The combination as defined in claim 2 wherein each latch device comprises a locking member pivotally mounted on the frame means, the locking member comprising a cam profile defining a receiving pocket for the cross-link of the respective pivot arm assembly, the locking member being pivotally cammed by the cross-link from a link-receiving position to a link-retaining and locking position when engaged by the cross-link.

4. The combination as defined in claim 3 wherein each locking member includes a handle for pivoting the locking member to a position releasing the cross-link.

5. The combination as defined in claim 1 wherein the pivot arm assemblies of the respective front and rear wheels of each frame means are mounted for outward swinging movement towards the ends of the respective frame means for placing the wheels in operative position and inward swinging movement towards the center of the frame for placing the wheels in inoperative position.

6. The combination as defined in claim 1 wherein each frame means has attachment means for securing the frame means along the side of a vehicle.

7. The combination as defined in claim 1 wherein the respective frame means comprise an integral part of a vehicle framework.

8. The combination as defined in claim 1 wherein the wheels of said one set comprise rubber-tired road wheels.

9. The combination as defined in claim 1 wherein the frame means includes outer members in the form of rub rails for protecting the wheels of said one set against scrapes and the like.

10. The combination as defined in claim 9 wherein each rub rail comprises a channel section and a hardened steel outer rubbing plate secured to the channel section.

11. A vehicle such as a mine supply car having selectively useable wheel sets whereby the vehicle may be converted for use in selected operating modes by raising and lowering the wheels of one set between operative and inoperative positions, wherein the wheels of said one set are each carried by a pivot arm assembly which is mounted on the vehicle between inner and outer elongate horizontally extending side frame members for manual swinging movement in a vertical plane about a pivot axis between a first position and a second position, the associated wheel in one of said positions of the arm being in operative position below the level of the wheels of the other set and in the other position of the arm being in inoperative position above the level of the wheels of the other set, the vehicle further including means for releasably retaining each pivot arm assembly in the respective first and second positions, wherein the means for releasably retaining each pivot arm assembly in the respective first and second positions comprises first and second latch devices positioned in a substantially horizontal plane between the side frame members on opposite sides of the respective pivot axis, each pivot arm assembly being pivotally connected at one end thereof between the respective side frame members, having a latch formation at its opposite end for engagement with the respective latch devices, and mounting means for the respective wheel vertically offset between said ends, and each pivot arm assembly is adapted to swing substantially 180° between the respective first and second positions, in each of such positions the arm being substantially horizontally disposed on opposite sides of said pivot axis, respectively.

12. A vehicle as defined in claim 11 wherein each latch device includes a pivotal manually releasable locking member having a cam profile defining a receiving means for a part of the respective pivot arm assembly, said part of the pivot arm assembly being adapted pivotally to cam the locking member into an arm retaining position when brought into engagement with the cam profile.

13. A vehicle as defined in claim 11 wherein the wheels of said one set comprise front and rear wheels on opposite sides of the vehicle respectively, the pivot arm assemblies being adapted to swing outwardly towards the ends of the vehicle to lower the wheels into operative position and inwardly towards the center of the vehicle to raise the wheels into inoperative position.

14. A vehicle as defined in claim 11 wherein the wheels of said one set are road wheels and the wheels of said other set are flanged rail-engageable wheels.

15. A vehicle as defined in claim 11 wherein the pivot arm assemblies and latch devices are carried in elongate frames, and the vehicle includes attachment means securing the frames horizontally along the respective sides of the vehicle.

16. The invention of claim 15 wherein each pivot arm assembly comprises a pair of pivot arms having pivot pins at the one end for pivotally connecting the arms to inner and outer members of the respective elongate frame, the mounting means comprising a wheel axle connected between the pivot arms and the latch formation comprising a cross link between the arms.

* * * * *